United States Patent [19]
Jorgensen

[11] 4,161,188
[45] Jul. 17, 1979

[54] JET TYPE LIQUID LEVEL SENSOR AND SYSTEM

[75] Inventor: Richard G. Jorgensen, Santa Ana, Calif.

[73] Assignee: Parker-Hannifin Corporation, Cleveland, Ohio

[21] Appl. No.: 856,997

[22] Filed: Dec. 2, 1977

[51] Int. Cl.² ............................................. F15c 1/14
[52] U.S. Cl. .................................. 137/386; 137/393; 137/842; 73/290 R
[58] Field of Search .................. 73/290, 548; 137/209, 137/386, 389, 390, 393, 842

[56] References Cited
U.S. PATENT DOCUMENTS

| | | | |
|---|---|---|---|
| 3,020,924 | 2/1962 | Davies | 137/386 |
| 3,168,105 | 2/1965 | Cisco et al. | 137/386 |
| 3,174,503 | 3/1965 | Absolon | 137/393 |
| 3,269,404 | 8/1966 | Lebow | 137/386 |
| 3,335,746 | 8/1967 | Lebow | 137/389 |
| 3,469,593 | 9/1969 | O'Keefe | 137/842 |
| 3,561,465 | 2/1971 | deGraaf | 137/386 |
| 3,703,907 | 11/1972 | Richards | 137/386 |
| 4,024,887 | 5/1977 | McGregor | 137/386 |

Primary Examiner—Martin P. Schwadron
Assistant Examiner—G. L. Walton
Attorney, Agent, or Firm—John N. Wolfram

[57] ABSTRACT

A jet type liquid level sensor and its combination with a fluid pressure operated valve whose opening and closing is controlled by the sensor at predetermined liquid levels within a tank in which the sensor and valve are installed. The sensor is designed for installation such that the jet stream issuing from a nozzle thereon travels horizontally to a receiving orifice which transmits the velocity head of the jet stream to an actuator for holding the valve open until such time that the jet stream is diffused by rising level of liquid in the tank. The nozzle has a shroud surrounding the jet stream and a pickup tube that extends a substantial distance below the nozzle. The pickup tube delivers liquid to the shroud for diffusing the jet stream when the liquid level is falling from the predetermined high shutoff level to the predetermined low reopening level corresponding to the position of the lower end of the tube at which point the jet stream is re-established for opening the valve. The high and low levels are a substantial distance apart so as to avoid frequent cycling of the valve.

12 Claims, 2 Drawing Figures

JET TYPE LIQUID LEVEL SENSOR AND SYSTEM

BACKGROUND OF THE INVENTION

In valve devices for controlling the level to which tanks may be filled with liquid, it heretofore has been known to utilize a fluid pressure operated valve to control flow of liquid into the tank and to use a jet type sensor for controlling opening and closing of the valve according to the level of the liquid within the tank. Such devices are disclosed, for example, in U.S. Pat. Nos. 3,020,924 and 3,168,105 and in French Pat. No. 313524 published June 15, 1956.

In these devices, the jet sensors include a nozzle and a receiver, the receiver being axially aligned with, but spaced from the nozzle. Part of the liquid under pressure from the valve inlet is diverted to the nozzle and discharged therefrom in a jet stream that is received by the receiver with substantially no pressure loss when the level of liquid within the tank is below the jet stream and is transmitted to one side of a valve actuator for holding the valve open. When the liquid level rises so as to cause submerging of the jet stream, the stream is diffused whereby relatively little or no pressure is received by the receiver for transmittal to the actuator and the valve then closes by spring and/or fluid pressure.

In U.S. Pat. No. 3,168,105 the nozzle and receiver are vertically aligned when installed and there is a shroud that extends from the nozzle and which has an open end that surrounds and axially overlaps the receiver. A pickup tube connects to the interior of the shroud and has a free open end below both the shroud open end and the receiver inlet. When the liquid level in the tank reaches the lower end of the tube, liquid is drawn through the tube into the shroud by aspirating action of the jet stream between the nozzle and receiver but not enough to diffuse the stream. Closing action starts to occur when the liquid level in the tank reaches the open end of the shroud but because of the vertical arrangement, the submersion and diffusion of the jet stream is gradual and therefore the closing action of the valve is not rapid and variation in shutoff level can occur, particularly if there is variation in the supply pressure. When the tank level falls, the shroud will remain full of liquid and diffuse the jet until the open end of the pickup tube is uncovered and therefore the valve will not reopen until there has been a substantial drop in the tank level. This eliminates frequent cycling of the valve.

In U.S. Pat. No. 3,020,924, the nozzle and receiver are horizontally aligned and the consequently horizontal jet stream will be completely submerged and diffused quickly by the rising level of liquid in the tank with rapid shutoff of the valve. However, there is no shroud and pickup tube so that the jet stream will be quickly reestablished upon a slight drop in the tank level and frequent cycling of the valve can occur.

In the French patent, a hand-held filling nozzle is disclosed in which the direction of the jet stream may approach horizontal and there is a shroud and pickup tube. However, the valve must shutoff before the liquid level reaches the jet stream to avoid spilling liquid from the tank. This is accomplished by overlapping the receiver with the shroud to restrict flow of liquid from the shroud and hence jet stream diffusion and valve shutoff occurs when the lower end of the tube becomes submerged and liquid is drawn up the tube and into the shroud. In such case shutoff is not as rapid or as accurate as when the jet is submerged by the rising liquid level in the tank. The hand-held nozzle is not intended to provide for reopening the valve upon drop in the tank level but if the device were adapted to such use reopening would occur when level dropped below the bottom of the tube and hence there would be rapid cycling of the valve between open and closed positions.

SUMMARY OF THE INVENTION

The present invention provides a jet sensor for use with a valve through which a tank may be filled to a predetermined high level and wherein the tank will be automatically refilled when the level drops to a predetermined and significantly different lower level. The invention has particular application to the main fuel tank for feeding fuel to an aircraft engine and which is to be automatically refilled from another tank when the level drops to a predetermined lower level.

The sensor has a nozzle with an orifice through which liquid is discharged as a horizontal jet stream to a receiver which transmits the velocity head or pressure of the stream to an actuator for holding the valve open until the jet stream is diffused, whereupon the valve closes. The sensor has a shroud surrounding the nozzle and having an open end that extends toward the receiver but is spaced therefrom so that the rising liquid level in the tank may quickly submerge the entire horizontal jet stream for causing rapid closing of the valve.

The sensor also has a pickup tube connected at one end to the interior of the shroud and whose other end extends a substantial distance below the path of the jet stream and functioning in conjunction with the shroud to prevent reestablishment of the jet stream, and hence opening of the valve, until the level of the liquid has fallen a substantial distance from the valve shutoff point.

DETAIL DESCRIPTION

Figure 1:
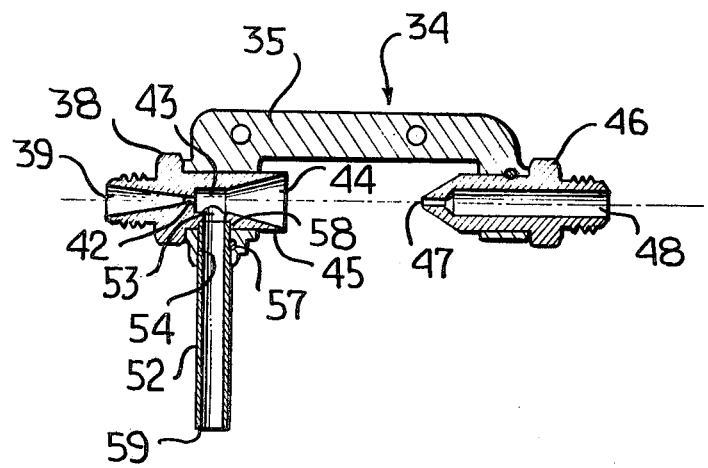
FIG. 1 is a cross section view of the sensor.
Figure 2:
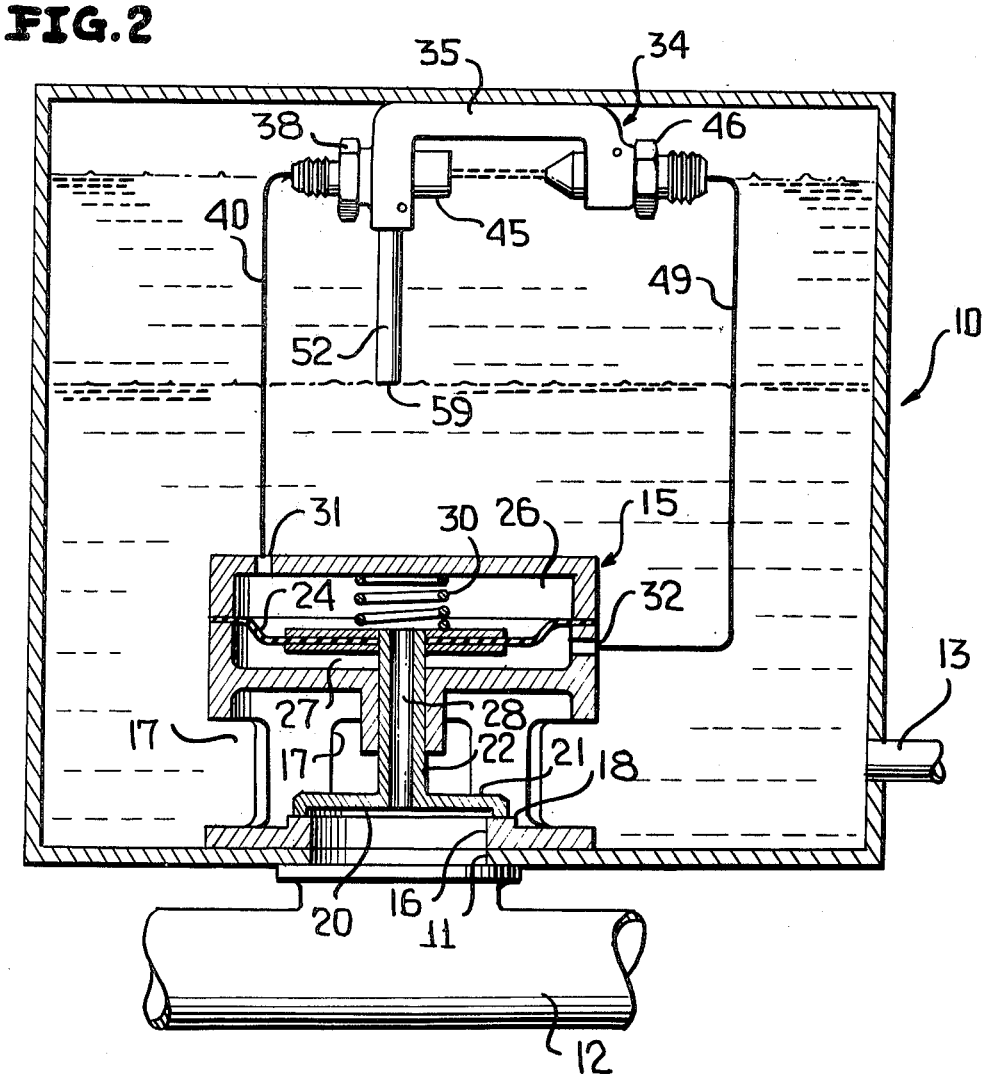
FIG. 2 is a view of the sensor and a valve controlled thereby installed in a tank, the valve being shown in schematic form.

As shown in FIG. 2, in a typical aircraft fuel tank installation, a main tank 10 has an opening 11 to which a liquid fuel supply manifold 12 is connected. The tank has an outlet 13 through which fuel may be fed to an engine and manifold 12 has provisions, not shown, for connection to other tanks from which fuel may be transferred to tank 10 and for connection to a fuel supply on the ground.

Mounted in the tank is a fluid pressure operated valve 15 having an inlet port 16, outlet ports 17 and a valve seat 18 between the inlet and outlet ports. A valve element 20 has a poppet portion 21 engageable with seat 18 and a stem 22 that is connected to a valve actuator that is in the form of a flexible and movable diaphragm 24 that divides the upper portion of valve 15 into first and second chambers 26, 27. Stem 22 has a duct 28 that connects valve inlet port 16 with chamber 26. Actuator 24 is pressed by spring 30 toward valve closing position and has an effective area larger than that of poppet 21. Chamber 26 has a port 31 and chamber 27 has a port 32.

A level sensing device or sensor 34 is mounted at the top of the tank. It includes a body 35 on which is mounted a nozzle 38 having an inlet 39 connected by a conduit 40 to port 31, a discharge orifice 42, and enlarged passages 43, 44 formed in a shroud portion 45. Body 35 also has mounted on it a receiver 46 having an inlet orifice 47 communicating with an enlarged outlet passage 48 that is connected to port 32 by conduit 49. The open end of nozzle shroud 45 projects toward receiver 46 but is spaced a substantial distance therefrom. Body 35 is mounted in the tank so that nozzle 38 and receiver 46 will be substantially in horizontal axial alignment with each other. Attached to bracket 35 is a pickup tube 52 whose upper end connects to nozzle bore 43 via a lateral bore 53 in the nozzle. Tube 52 is held within bore 54 of bracket 35 by a rivet 57 and the upper end of the tube projects into a counterbore 58 in the nozzle to angularly orient the latter. The free or lower end 59 of tube 52 is open to the interior of the tank.

Body 35 between the nozzle and receiver is on the upper side only of these members so that there is no obstruction between the interior of the tank and the lower and horizontal sides of the jet stream. Likewise there is no obstruction in an axial direction between the shroud passages 43, 44 and the interior of the tank in a direction toward receiver 46.

OPERATION

When tank 10 is to be filled, liquid fuel under pressure is supplied to manifold 12 and enters valve inlet port 16 and opens valve poppet 21 against the closing pressure of spring 30. A portion of the incoming liquid passes through duct 28 into chamber 26 then through port 31 and conduit 40 to nozzle 38 where it discharges from orifice 43 in a small diameter jet stream that travels in substantially a horizontal direction toward receiver 46 and is received within orifice 47 with no significant loss of velocity head or pressure. The jet liquid then passes through conduit 49 into chamber 27 to pressurize the lower side of actuator 24 for counteracting pressure in chamber 26 and thus assisting in holding valve poppet 21 in open position. At this time, the only liquid within shroud passages 43, 44 is the small diameter jet stream, the remainder of the shroud passages being filled with ullage gases which have no significant effect upon the jet stream.

When the liquid level in the tank reaches the open bottom end 59 of tube 52 some liquid may be drawn upwardly in the tube into shroud passages 43, 44 by aspirating action of the jet stream but not enough to interfer with or diffuse the jet stream. When the liquid level reaches the lower portions of shroud passages 43, 44, it will enter the same but will have no effect on the jet stream until it reaches the level of the jet stream. It will then quickly submerge the entire jet stream between discharge orifices 42 and receiving orifice 47 to diffuse the stream and cutoff transmission of velocity head or pressure to receiver 46. There will then be a rapid loss of pressure within valve chamber 27 whereupon spring 30 and fluid pressure in chamber 26 will quickly close valve poppet 21. The rapid submerging of the horizontal jet stream and rapid closing of the valve thus results in accurate control of filling of the tank to the predetermined high level despite variations in the fuel supply pressure.

When the aircraft is in operation, fuel from tank 10 is delivered to an engine by a conduit 13. Meanwhile, manifold 12 is pressurized by fuel from another tank (not shown) from which fuel is to be automatically transferred to tank 10 when the level in tank 10 has dropped to a predetermined low level. During this time liquid fuel from manifold 12 continues to pass through duct 28 to pressurize chamber 26 and through conduit 40 to nozzle 38. However, even though the level in the tank has dropped below nozzle discharge orifice 42 and receiver orifice 47, liquid will continue to be drawn up through tube 52 to maintain shroud passages 43, 44 substantially full of liquid which continues to diffuse the jet stream issuing from nozzle orifice 42 to prevent transmission of jet stream pressure to chamber 27 whereby valve 21 will remain closed.

When the level drops below the lower end of tube 52, liquid will cease being drawn up through the tube, shroud passages 43, 44 will be emptied of liquid, and the jet stream will be quickly reestablished for applying pressure in chamber 27 to open valve poppet 21. The length of tube 52 is selected so that there will be a significant difference between the high shut off level where the jet stream is located and the lower re-opening level at the bottom of tube 52 whereby the valve will not be subject to frequent on-off cycling.

In addition to providing more precise control of shut off and reopening levels, the horizontally acting jet stream permits the shut off level to be closer to the top of the tank than with a vertically acting jet stream.

Although only one form each of the sensor, valve, and the installation of the sensor and valve in the tank are illustrated, it is obvious that each of these can be varied within the scope of the present invention. For example, the sensor 34 could be of one piece construction, valve 15 could be pilot operated and/or it could be mounted at the top or a side of the tank instead of the bottom or even externally of the tank, and manifold 12 could be within the tank or externally at the top or side thereof. Also, if desired, conduit 40 can be connected directly to manifold 12 instead of chamber 26, in which case opening 31 is omitted.

I claim:

1. A jet liquid level sensor comprising a body having a nozzle and a receiver, the nozzle having an inlet and a discharge orifice, the receiver having an inlet orifice and an outlet, said orifices being aligned along a substantially horizontal axis and spaced apart, a shroud extending from the nozzle beyond said discharge orifice toward said receiver, said shroud being horizontally separated from said receiver by an unobstructed space, said shroud defining a shut off chamber axially adjacent said discharge orifice through which liquid issuing from the discharge orifice passes in a substantially horizontal direction as a jet stream that is received in said receiver inlet, means to introduce liquid vertically into said shut off chamber at a flow rate insufficient to divert said jet stream from said receiver inlet, said means including a pickup tube extending from the sensor and having one end communicating laterally with said shut off chamber and having its other end radially spaced from said discharge orifice, and said shroud having open end means communicating axially with said shut off chamber to introduce liquid from said tank axially into said shut off chamber to prevent the jet stream from flowing to the receiver inlet.

2. The sensor of claim 1 in which said shroud has a side opening connected with said shut off chamber and said one end of the tube projects into said side opening.

3. The sensor of claim 1 in which said shut off chamber comprises a cylindrical bore portion adjacent said discharge orifice, and said cylindrical bore portion is of substantially the same diameter as the smallest diameter of said pick up tube.

4. The sensor of claim 1 in which said body has a pair of axially aligned openings in which said nozzle and receiver are respectively mounted.

5. The sensor of claim 1 in which said body includes a portion extending between said nozzle and receiver and said portion is diametrically opposite said pickup tube relative to said nozzle.

6. The sensor of claim 1 in which said pickup tube extends from the sensor at right angles to the axes of said orifices.

7. The sensor of claim 1 in which said shroud extends no more than one half the axial distance between said orifices.

8. The sensor of claim 1 in which said pick up tube has substantially the same diameter throughout its length.

9. In combination, a tank, means to introduce liquid under pressure into the tank, said means including a fluid pressure operated valve element, a jet liquid level sensor including a discharge orifice and a receiving orifice arranged along a substantially horizontal axis, means to divert some of the pressurized liquid to the discharge orifice from which it may issue in a jet stream receivable by the receiving orifice, an actuator for moving the valve to open and closed positions, conduit means to connect the receiving orifice to said actuator whereby pressure of said jet stream received by said receiving orifice will be transmitted to said actuator for opening said valve element, said sensor being mounted at the upper side of the tank and so that in operation the jet stream will travel in substantially a horizontal direction, a hollow shroud surrounding the discharge orifice and extending toward said receiving orifice, said shroud defining a shut off chamber axially adjacent said discharge orifice, means to introduce liquid from said tank laterally into said shut off chamber at a flow rate insufficient to divert said jet stream from said receiver inlet during filling of said tank, and open end means communicating axially with said shut off chamber to introduce liquid from said tank axially into said shut off chamber to prevent the jet stream from flowing to the receiver inlet when the tank is filled.

10. The combination of claim 9 in which said shroud terminates an open end that is axially spaced from said receiving orifice said axial space is radially unobstructed in a direction toward the bottom of the tank.

11. The combination of claim 9 in which said shroud extends no more than one half the axial distance between said orifices.

12. The combination of claim 9 in which said introducing means includes a pickup tube having one end communicating with said shut off chamber and another end open to the interior of the tank at a location below said orifices.

* * * * *